US 8,245,771 B2
Aug. 21, 2012

(12) United States Patent
Kruspe

(10) Patent No.: US 8,245,771 B2
(45) Date of Patent: *Aug. 21, 2012

(54) METHOD AND APPARATUS FOR DEMAGNETIZING A BOREHOLE

(75) Inventor: Thomas Kruspe, Wietzendorf (DE)

(73) Assignee: Baker Hughes Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/030,728

(22) Filed: Feb. 18, 2011

(65) Prior Publication Data

US 2011/0139434 A1 Jun. 16, 2011

Related U.S. Application Data

(63) Continuation of application No. 11/298,034, filed on Dec. 9, 2005, now Pat. No. 7,913,756.

(60) Provisional application No. 60/635,844, filed on Dec. 13, 2004.

(51) Int. Cl.
*E21B 31/06* (2006.01)

(52) U.S. Cl. ........................ 166/66.5; 166/248

(58) Field of Classification Search .............. 166/248, 166/66.5; 175/328
See application file for complete search history.

(56) References Cited

U.S. PATENT DOCUMENTS

| 2,246,542 A | 6/1941 | Smith | |
|---|---|---|---|
| 2,999,203 A * | 9/1961 | Brown | 324/303 |
| 4,384,313 A | 5/1983 | Steingroever et al. | |
| 4,700,142 A | 10/1987 | Kuckes | |
| 5,220,963 A | 6/1993 | Patton | |
| 5,351,755 A | 10/1994 | Howlett | |
| 5,419,405 A * | 5/1995 | Patton | 175/27 |
| 5,481,808 A | 1/1996 | Kools et al. | |
| 6,037,767 A * | 3/2000 | Crescenzo et al. | 324/220 |
| 6,580,273 B2 | 6/2003 | Reiderman et al. | |
| 7,082,994 B2 | 8/2006 | Frost, Jr. et al. | |
| 7,180,287 B2 | 2/2007 | Rottengatter et al. | |
| 7,405,563 B2 | 7/2008 | Kruspe et al. | |
| 7,913,756 B2 * | 3/2011 | Kruspe | 166/248 |
| 2002/0112856 A1 | 8/2002 | Van Steenwyk et al. | |
| 2005/0248342 A1 | 11/2005 | Rottengatter et al. | |

(Continued)

FOREIGN PATENT DOCUMENTS

DE 2850562 A1 6/1980

(Continued)

OTHER PUBLICATIONS

Wilson, Harry, et al., Wellbore Position Errors Caused by Drilling Fluid Contamination, SPE 71400, 2001 SPE Annual Technical Conference and Exhibition, Sep. 30-Oct. 3, 2001, pp. 1-8.

(Continued)

*Primary Examiner* — Brad Harcourt

(74) *Attorney, Agent, or Firm* — Mossman Kumar & Tyler PC

(57) ABSTRACT

A demagnetizing sub having an electromagnet or a rotating magnet is used for demagnetizing magnetized material in a wellbore. By gradually reducing the magnetic field, the magnetized material within the borehole is demagnetized.

13 Claims, 20 Drawing Sheets

(6 of 20 Drawing Sheet(s) Filed in Color)

U.S. PATENT DOCUMENTS

| | | |
|---|---|---|
| 2006/0170425 A1 | 8/2006 | Kruspe et al. |
| 2007/0206555 A1 | 9/2007 | Kruspe et al. |
| 2009/0015254 A1 | 1/2009 | Castillo et al. |

FOREIGN PATENT DOCUMENTS

| | | |
|---|---|---|
| EP | 0021274 A1 | 1/1981 |
| EP | 0301671 A2 | 2/1989 |

OTHER PUBLICATIONS

Torkildsen, Torgeir, et al., Drilling Fluid Affects MWD Magnetic Azimuth and Wellbore Position, IADC/SPE 87169, IADC/SPE Drilling Conference, Mar. 2004, pp. 1-8.

Wilson, Harry, et al.; Wellbore Position Errors Caused by Drilling Fluid Contamination, SPE 75329, SPE Drilling & Completion, Dec. 2001, pp. 208-213.

* cited by examiner

METHOD AND APPARATUS FOR DEMAGNETIZING A BOREHOLE

CROSS-REFERENCES TO RELATED APPLICATIONS

This application is a continuation of U.S. patent application Ser. No. 11/298,034, filed Dec. 9, 2005, now U.S. Pat. No. 7,913,756, with a priority claim to U.S. Provisional Patent Application Ser. No. 60/635,844 filed on Dec. 13, 2004.

BACKGROUND OF THE INVENTION

1. Field of the Invention

The invention relates generally to a downhole formation analysis and in particular to demagnetizing a borehole.

2. Summary of the Related Art

It is well known that drilling mud may contain magnetic particles which may influence surveys taken by monitoring while drilling (MWD) directional sensors. This effect is described in IADC/SPE 87169 and SPE 71400. The particles are mainly from casing and drill-string wear. The particles collect especially in synthetic oil-based mud which is recycled and used for a long period of time and even at different locations. Magnetic filters (ditch magnets) can not filter the magnetic particles out of the mud because they are too small to be attracted to the magnetic filter. The mud contaminate with magnetic steel particles can invade the formation and can also collect in the filter cake. This collection of magnetic particles creates a zone close to the borehole wall containing magnetic material which can not circulate with the rest of the drilling mud. When permanent magnets from nuclear magnetic resonance (NMR) tools, magnetic fishing tools or casing collar locaters are moved through the borehole, these collected particles in the filter cake or the invaded zone can become magnetized. Because of the magnetic resonance the particles maintain their magnetic influence and emit a magnetic field for a long time. The magnetic field created by these magnetically aligned particles can influence the performance of magnetic tools deployed from a wireline or drill string such as magnetic azimuth measurements or other magnetic measurements associated with the borehole. A similar problem occurs in cased borehole where the casing is made of a magnetic material such as steel. The resulting magnetization of the casing may affect the performance of sensors such as magnetometers that are subsequently conveyed through the casing.

SUMMARY OF THE INVENTION

One embodiment of the invention is an apparatus for reducing the effect of magnetized material in a wellbore in an earth formation. The apparatus includes a downhole assembly conveyed in the borehole and a device included in the downhole assembly which produces an alternating magnetic field in the wellbore, wherein the device is operated to gradually diminish an amplitude of the alternating magnetic field at at least one depth in the wellbore. The device may be an electromagnet coupled to a source of alternating current and a processor which controls the source to reduce the amplitude of the field produced by the electromagnet. The device may be a spinning magnet, permanent or a DC-powered electromagnet. The downhole assembly may be a bottomhole assembly conveyed on a drilling tubular or it may be a component of a string of wireline conveyed instruments. When an electromagnet is used, it includes a coil and a core. The electromagnet may further include a yoke made of a soft magnetic material. The core may have a laminated structure. The processor may select an initial amplitude of the alternating current from the current source based on a saturation field of the magnetized material and/or a magnetic field intensity which produced magnetization of the magnetized material. The axis of the electromagnet may be parallel to or transverse to the longitudinal axis of the downhole assembly. The electromagnet may have a two-pole structure or a four-pole structure. The core may have a helical structure. The borehole may be a cased borehole.

Another embodiment of the invention is a method of demagnetizing magnetized material in a wellbore in the earth formation. Use is made of a magnet included in a downhole assembly conveyed in the wellbore to produce an alternating magnetic field therein. The amplitude of the alternating magnetic field is then reduced. The magnet may be an electromagnet, in which case, the method includes coupling a source of alternating current to the electromagnet, and controlling the source of the alternating current to reduce the amplitude of the alternating magnetic field. The magnet may be a rotating permanent magnet or a rotating DC-powered electromagnet moved through the borehole. The method may include conveying the downhole assembly into the borehole on a drilling tubular or a wireline. The electromagnet may be provided with a coil through which the alternating current is passed and a core which concentrates magnetic flux provide by the magnetic field. The borehole may be a cased borehole.

BRIEF DESCRIPTION OF THE FIGURES

The patent or application file contains at least one drawing executed in color. Copies of this patent or patent application publication with color drawing(s) will be provided by the Office upon request and payment of the necessary fee. For detailed understanding of the present invention, references should be made to the following detailed description of an exemplary embodiment, taken in conjunction with the accompanying drawings, in which like elements have been given like numerals.

DETAILED DESCRIPTION OF THE INVENTION

Figure 1:
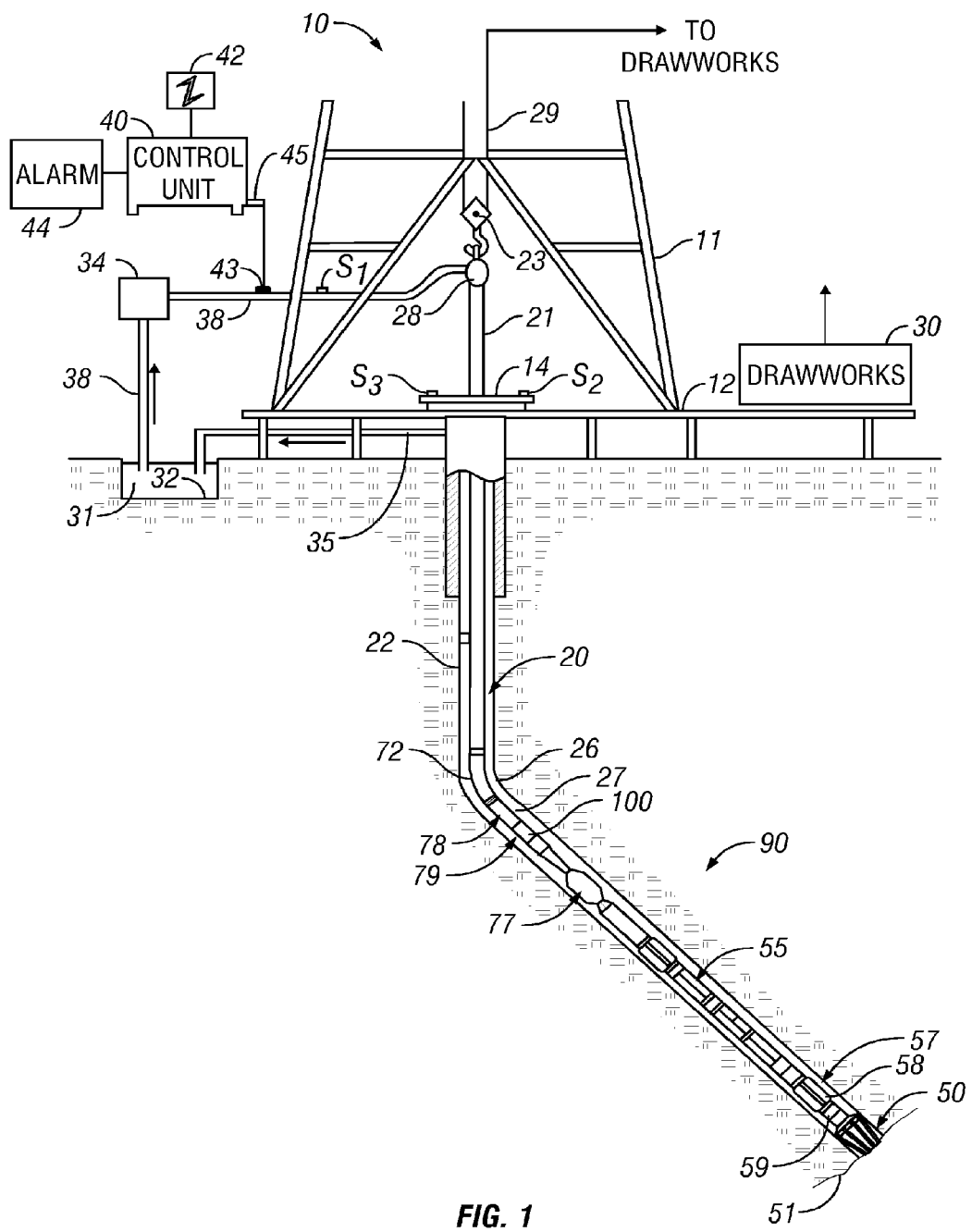
FIG. 1 is an illustration of the present invention deployed in a borehole from a drill string.

In view of the above, the present invention through one or more of its various aspects and/or embodiments is presented to provide one or more advantages, such as those noted below. FIG. 1 illustrates a schematic diagram of a MWD drilling system 10 with a drill string 20 carrying a drilling assembly 90 (also referred to as the bottom hole assembly, or "BHA") conveyed in a "wellbore" or "borehole" 26 for drilling the wellbore. The demagnetizing sub 100 is positioned on the drill string 20 below NMR tool 79. The drilling system 10 includes a conventional derrick 11 erected on a floor 12 which supports a rotary table 14 that is rotated by a prime mover such as an electric motor (not shown) at a desired rotational speed. The drill string 20 includes tubing such as a drill pipe 22 or a coiled-tubing extending downward from the surface into the borehole 26. The drill string 20 is pushed into the wellbore 26 when a drill pipe 22 is used as the tubing. For coiled-tubing applications, a tubing injector (not shown), however, is used to move the tubing from a source thereof, such as a reel (not shown), to the wellbore 26. The drill bit 50 attached to the end of the drill string breaks up the geological formations when it is rotated to drill the borehole 26. If a drill pipe 22 is used, the drill string 20 is coupled to a drawworks 30 via a Kelly joint 21, swivel 28 and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drill string 20 by a mud pump 34. The drilling fluid passes from the mud pump 34 into the drill string 20 via a desurger 36, fluid line 38 and Kelly joint 21. The drilling fluid 31 is discharged at the borehole bottom 51 through an opening in the drill bit 50. The drilling fluid 31 circulates uphole through the annular space 27 between the drill string 20 and the borehole 26 and returns to the mud pit 32 via a return line 35. The drilling fluid acts to lubricate the drill bit 50 and to carry borehole cutting or chips away from the drill bit 50. A sensor $S_1$ preferably placed in the line 38 provides information about the fluid flow rate. A surface torque sensor $S_2$ and a sensor $S_3$ associated with the drill string 20 respectively provide information about the torque and rotational speed of the drill string. Additionally, a sensor (not shown) associated with line 29 is used to provide the hook load of the drill string 20.

The rotating the drill pipe 22 only rotates the drill bit 50. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In the embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

A drilling sensor module 59 is placed near the drill bit 50. The drilling sensor module contains sensors, circuitry and processing software and algorithms relating to the dynamic drilling parameters. Such parameters preferably include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an NMR tool 79 are all connected in tandem with the drill string 20. Flex subs, for example, are used in connecting the MWD tool 79 in the drilling assembly 90. Such subs and tools form the bottom hole drilling assembly 90 between the drill string 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 preferably includes a computer or a microprocessor-based processing system, memory for storing programs or models and data, a recorder for recording data, and other peripherals. The control unit 40 is preferably adapted to activate alarms 44 when certain unsafe or undesirable operating conditions occur.

Figure 2:
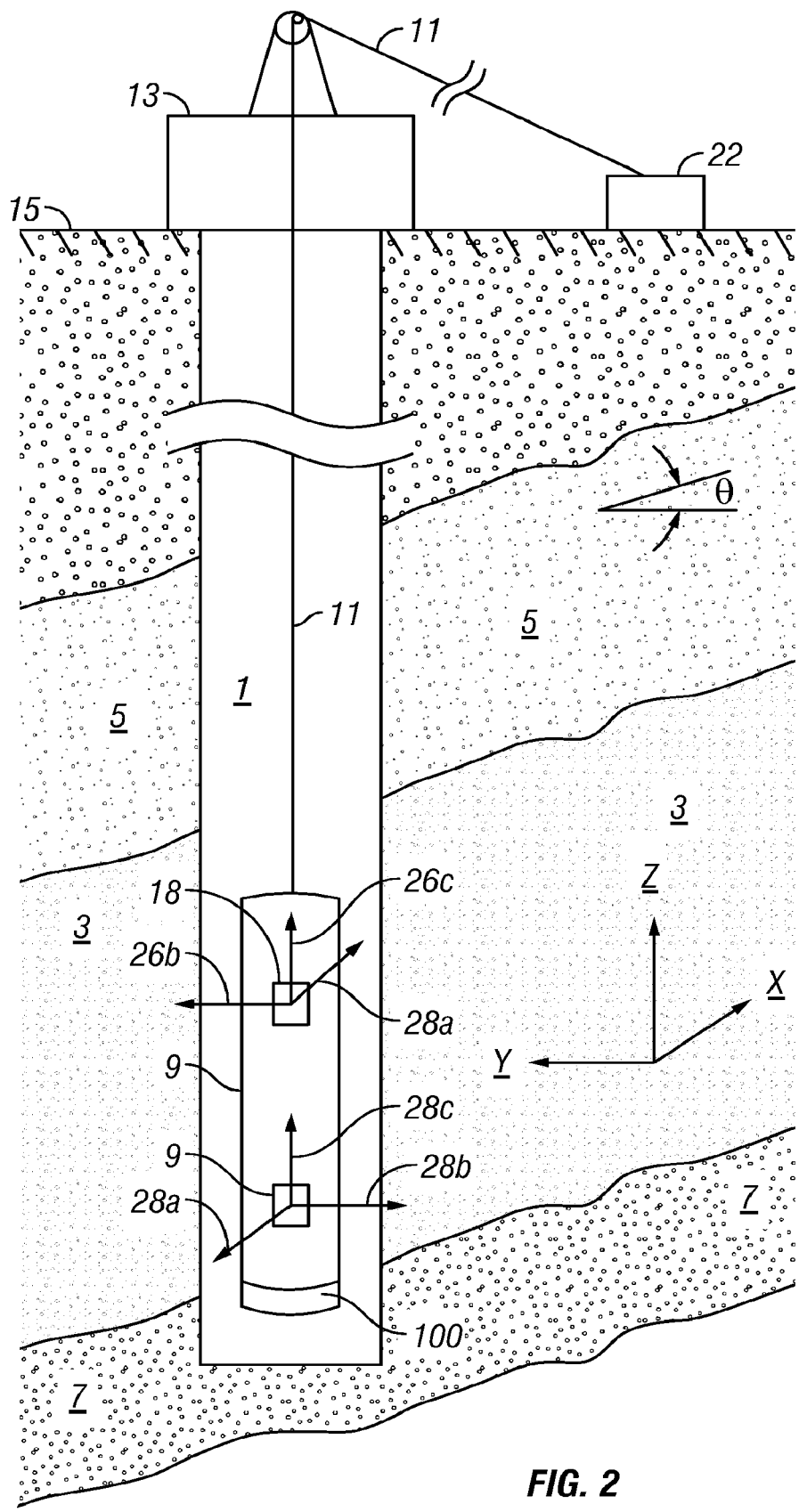
FIG. 2 is an illustration of the present invention deployed in a borehole from a wireline.

Turning now to FIG. 2, as shown in FIG. 2 the present invention is suitable for deployment in a borehole from a drill string. In this case the demagnetizing sub 100 of the present invention is deployed from a wireline beneath a multi-component resistivity tool 9 including a NMR tool 79. FIG. 1 schematically shows a wellbore 1 extending into a laminated earth formation, into which wellbore an induction logging tool as used according to the present invention has been lowered. The wellbore in FIG. 1 extends into an earth formation which includes a hydrocarbon-bearing sand layer 3 located between an upper shale layer 5 and a higher conductivity than the hydrocarbon bearing sand layer 3. An induction logging tool 9 and/or an NMR tool 79 including the demagnetizing sub 100 of the present invention have been lowered into the wellbore 1 via a wire line 11 extending through a blowout preventor 13 (shown schematically) located at the earth surface 15. The surface equipment 22 includes an electric power supply to provide electric power to the set of coils 18 and a signal processor to receive and process electric signals from the receiver coils 19. Alternatively, the power supply and/or signal processors are located in the logging tool.

Figure 3:
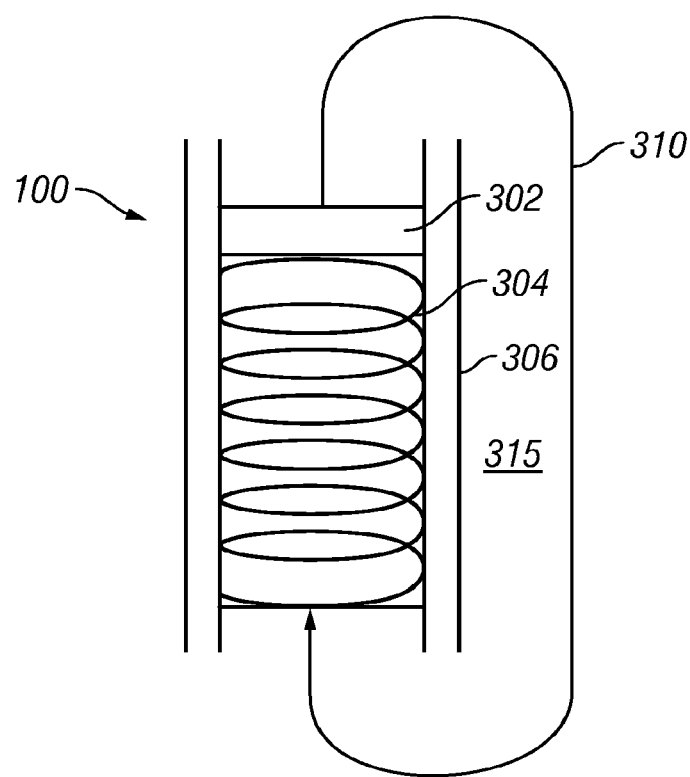
FIG. 3 is an illustration the demagnetizing sub showing an electromagnetic erasure field parallel to the borehole.

Turning now to FIG. 3, a schematic of the demagnetizing sub 100 of the present invention is illustrated showing demagnetizing sub 100 with a magnetic flux, B field 310 parallel to the borehole 306 axis. As shown in FIG. 3, in this geometry the axis of the coil 308 of the electromagnet is parallel with the cylinder axis of the demagnetizing sub 100. The sub may be part of a bottomhole assembly (BHA) conveyed on a drilling tubular or may be part of a string of wireline conveyed subs. For the purposes of the present invention, the term "downhole assembly" is used to designate a BHA or a string of wireline tools. Smart alternating current supply 302 includes a processor for providing a controlled alternating current to the electromagnet coil 308. A vertical coil with an iron core would produce a magnetic field similar to an NMR tool, but weaker unless an electric input of many kW is provided. The solution for producing a strong magnetic field with low power is the use of a yoke to concentrate the field outside the borehole in a ring around the tool.

Figure 4:
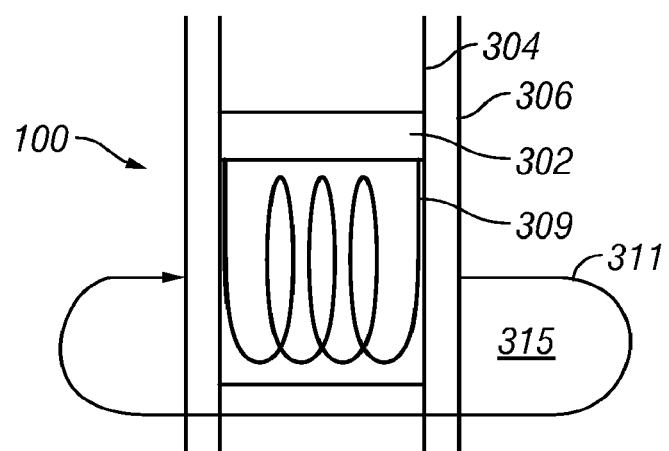
FIG. 4 is an illustration is an illustration the demagnetizing sub showing an electromagnetic erasure field perpendicular to the borehole.

Turning now to FIG. 4, a schematic of the invention is illustrated showing a demagnetizer sub 100 with B field 311 orthogonal to the borehole 306 axis. The sub may be part of a bottomhole assembly conveyed on a drilling tubular or may be part of a string of wireline conveyed subs. In this configuration the field direction is in a plane orthogonal to the borehole axis and the demagnetizer sub 100 axis. The electric current runs parallel to the axis. The electromagnet can be similar an anchor of a direct current (DC) electromotor. The anchor can have one pole or more, for example, 2 pole and 4 pole configurations.

The present invention provides a demagnetizer sub 100 that can demagnetize the borehole wall 306 that has been magnetized by a previous magnetic tool run. It is assumed that the magnetizable particles are in the drilling mud and hence in the mud cake, lining the borehole wall. Magnetization of the borehole environment can also happen if ferromagnetic components such as magnetite exist in the geologic formation. The demagnetizing is achieved by providing an AC (alternating current) electromagnet and moving it along the axis of the borehole. The present invention is also useful with a wireline logging run.

To demagnetize hard magnetic material the standard method is the application of an alternating magnetic field. The AC amplitude should reach a relatively high level, ensuring that the magnetic hysteresis loop of the component to be demagnetized becomes symmetrical to the origin of the BH diagram. Subsequently the AC amplitude is decreased slowly in order that the run-through hysteresis loop becomes smaller and smaller and disappears eventually.

The idea of the demagnetizer sub 100 described herein is that of an AC electromagnet, which provides the high magnetic field amplitude. The continuous and slow decrease of the field amplitude at the place of the magnetized mud particles is achieved by moving the electromagnet along the borehole axis. Ideally the demagnetizing field should initially reach at least the saturation field of the magnetized component, for iron this is of the order of 2 Tesla. To produce fields of this magnitude in the borehole wall, however, may be impractical, assuming that the electric power is limited to a couple of hundred Watts. Given the power limitations, it presently should be sufficient to produce a magnetic field substantially as high as the magnetic tool field which magnetized the particles. For example, if an NMR tool generates a magnetic field of 2000 Gauss having a particular spatial distribution, the present invention demagnetizing sub generates a demagnetizing field of 2000 Gauss having a similar spatial distribution.

Due to the cylindrical geometry of the borehole there exist essentially two geometries demonstrated herein for such an electromagnet. The electromagnet can apply a field that is either essentially parallel or orthogonal to the borehole axis as shown above in FIG. 3 and FIG. 4.

Figure 5:
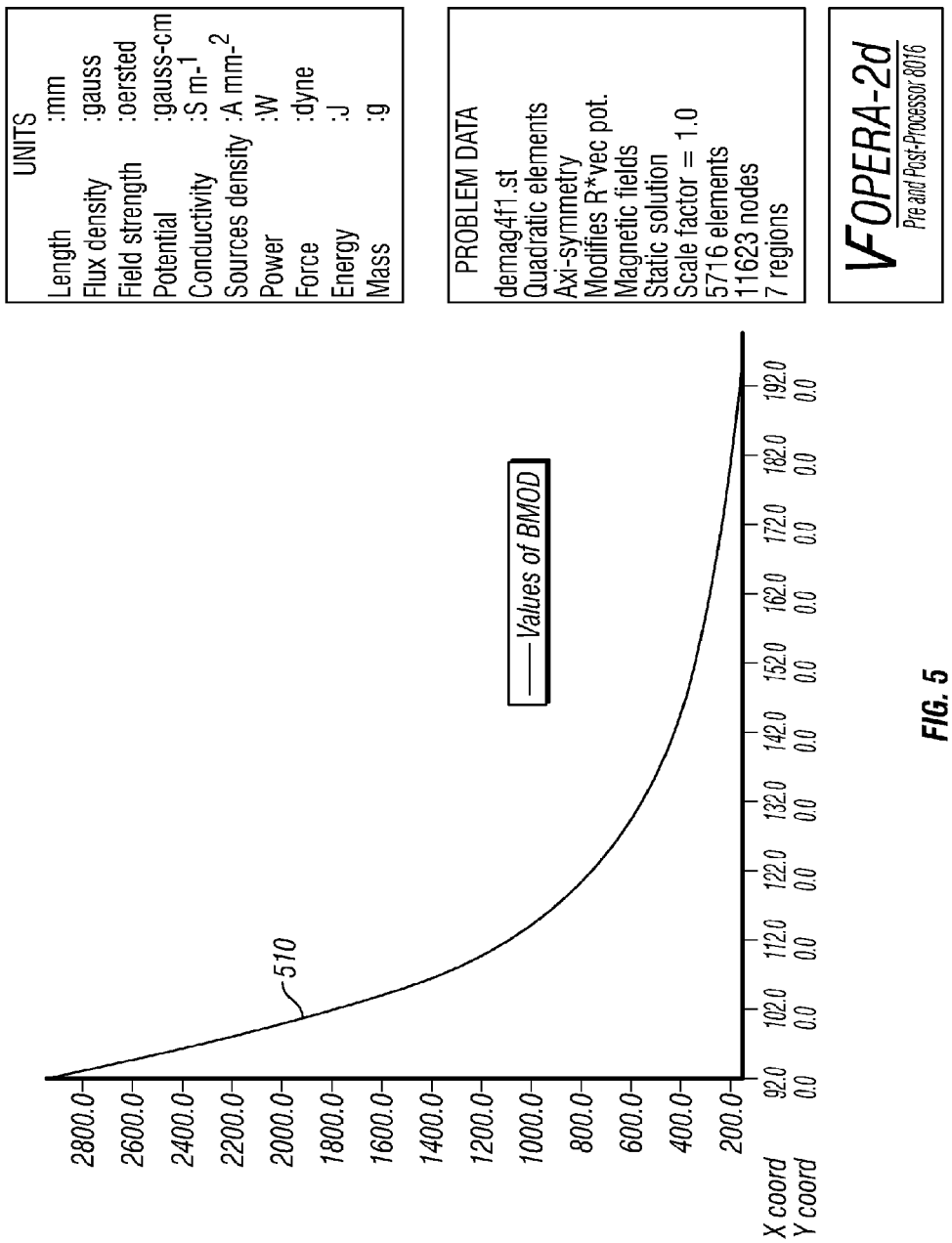
FIG. 5 is an illustration of the radial dependence of the flux density for a nuclear magnetic resonance (NMR) tool.

FIG. 5 illustrates the magnetic flux density 510 of a nuclear magnetic resonance (NMR) tool. The maximum flux density at the tool surface (radius 92 mm) is about 2200 Gauss. For the centered tool the flux density at the nominal borehole wall (radius 108 mm) is about 1200 Gauss. FIG. 5 illustrates the radial dependence of the flux density at Z=230 mm, i.e. at the lower end of the permanent magnet.

Figure 6:
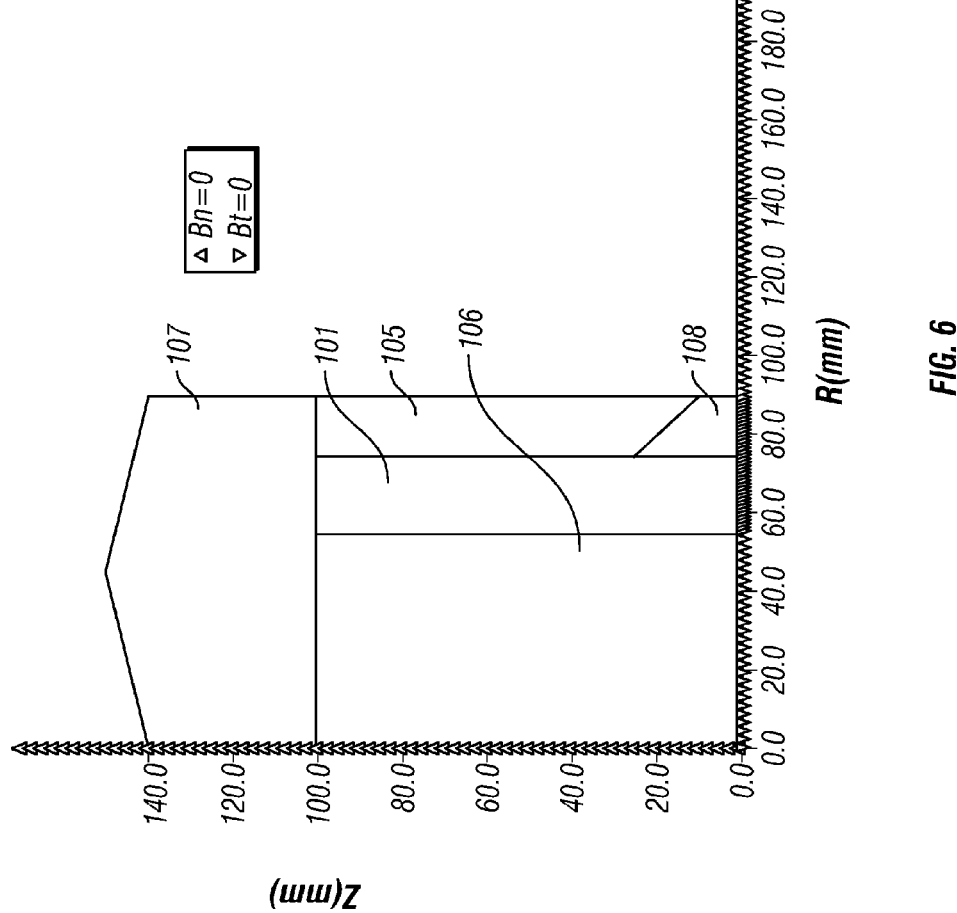
FIG. 6 is an illustration the geometry of the demagnetizing sub having a magnetic field parallel to the borehole in the present invention.
Figure 7:
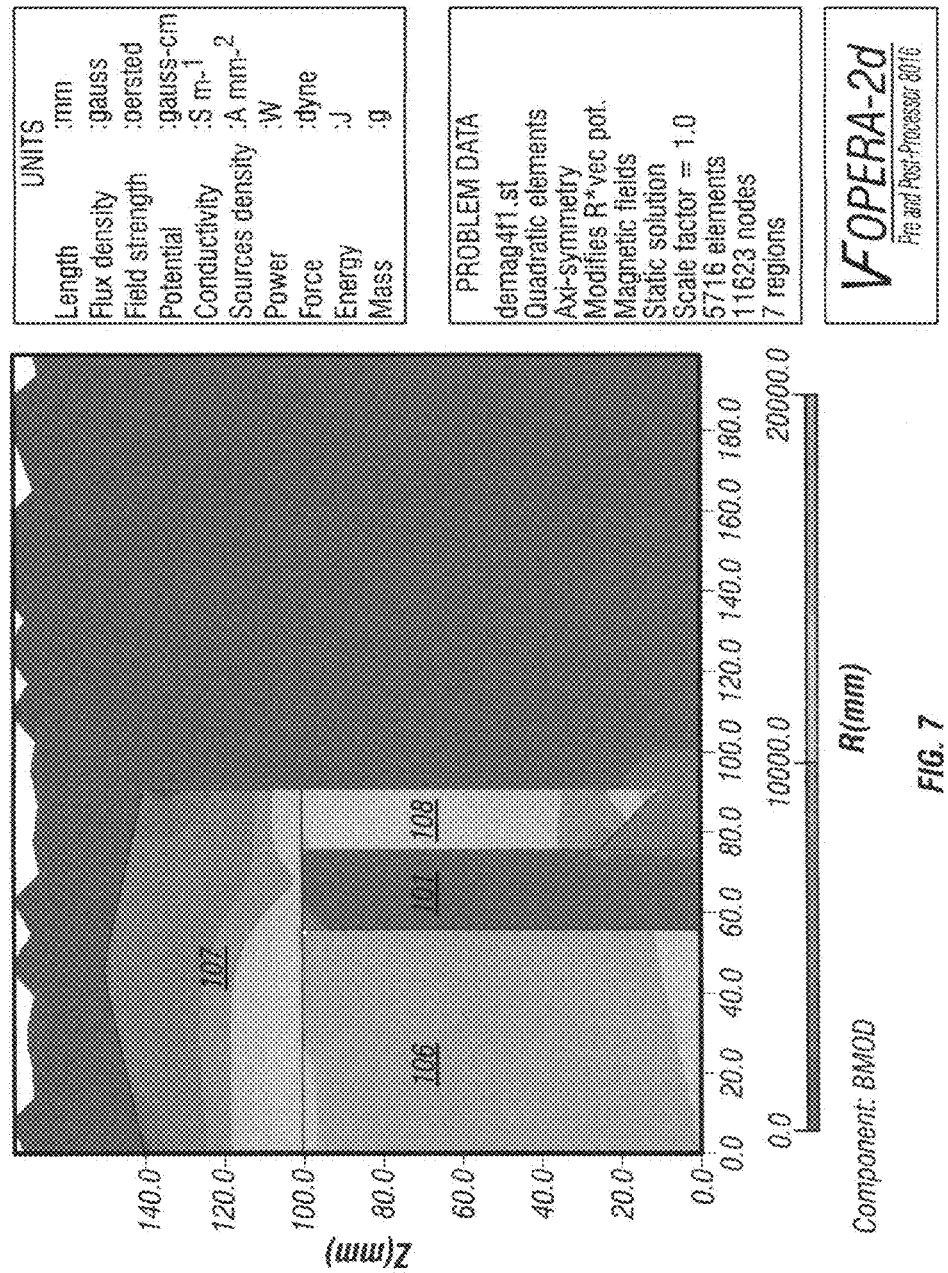
FIG. 7 is a contour plot of the magnetic flux density, showing that the magnetic flux density is predominately 15000 Gauss in the iron portion of the demagnetizing sub.

FIGS. 6-8 and 10-16 are finite element models showing a top right quarter section of a symmetrical illustration. FIG. 6 illustrates one example of geometry for the electromagnet of the demagnetizing sub 100 for generating a magnetic flux parallel to the borehole axis. Areas 105 and 106 are transformer iron. Area 107 is a yoke made of soft magnetic material to facilitate manufacturing and concentrate the flux. Area 101 is a copper (coil) and area 108 is a gap where the erasing magnetic flux density is concentrated. FIG. 7 illustrates a contour plot of the magnetic flux density for the geometry of FIG. 6. The plot shows flux density that it is mainly 15,000 Gauss in the transformer iron.

Figure 8:
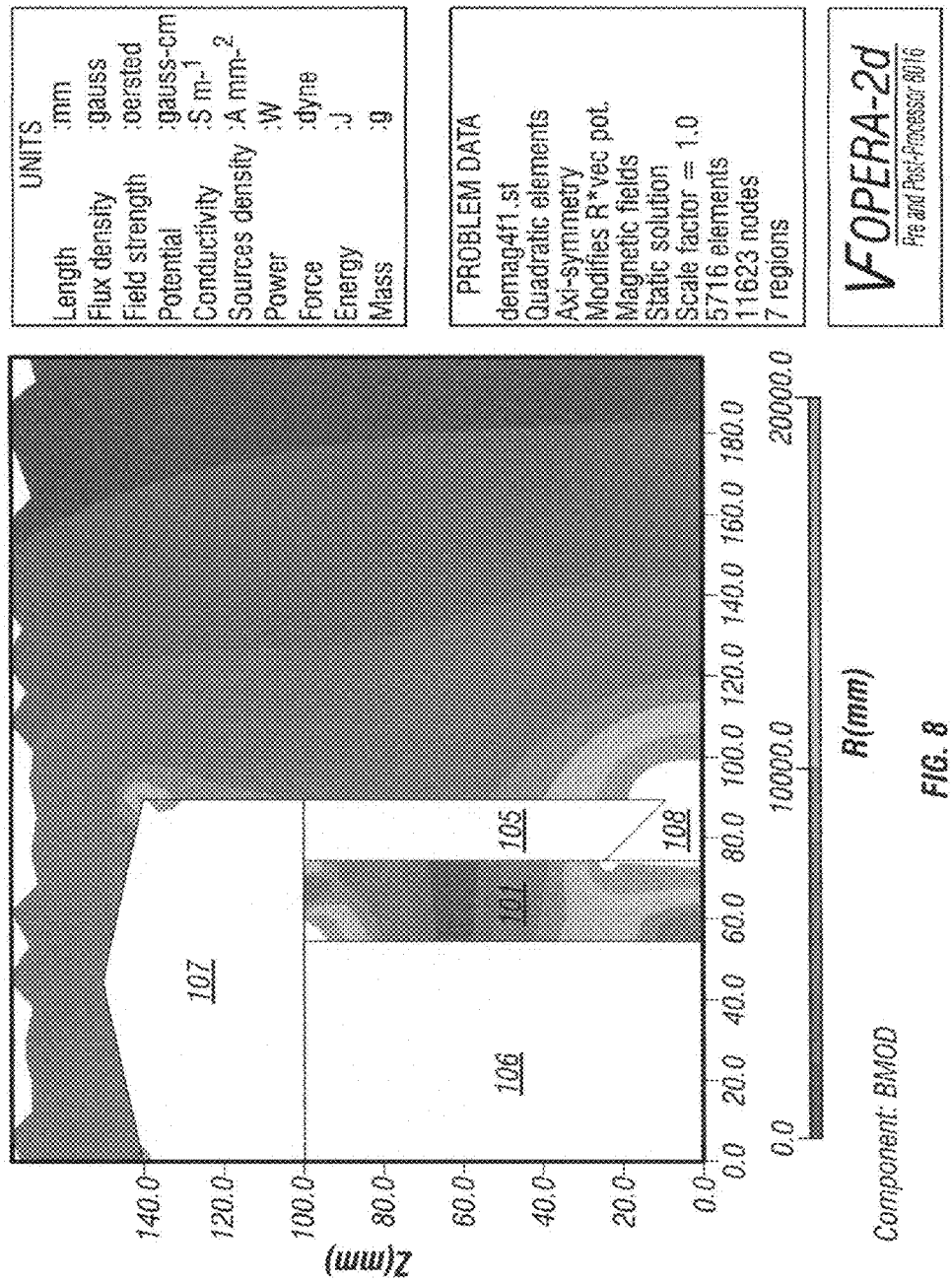
FIG. 8 is a contour plot of the magnetic flux density, showing the distribution of the magnetic flux outside of the demagnetizing sub.
Figure 9:
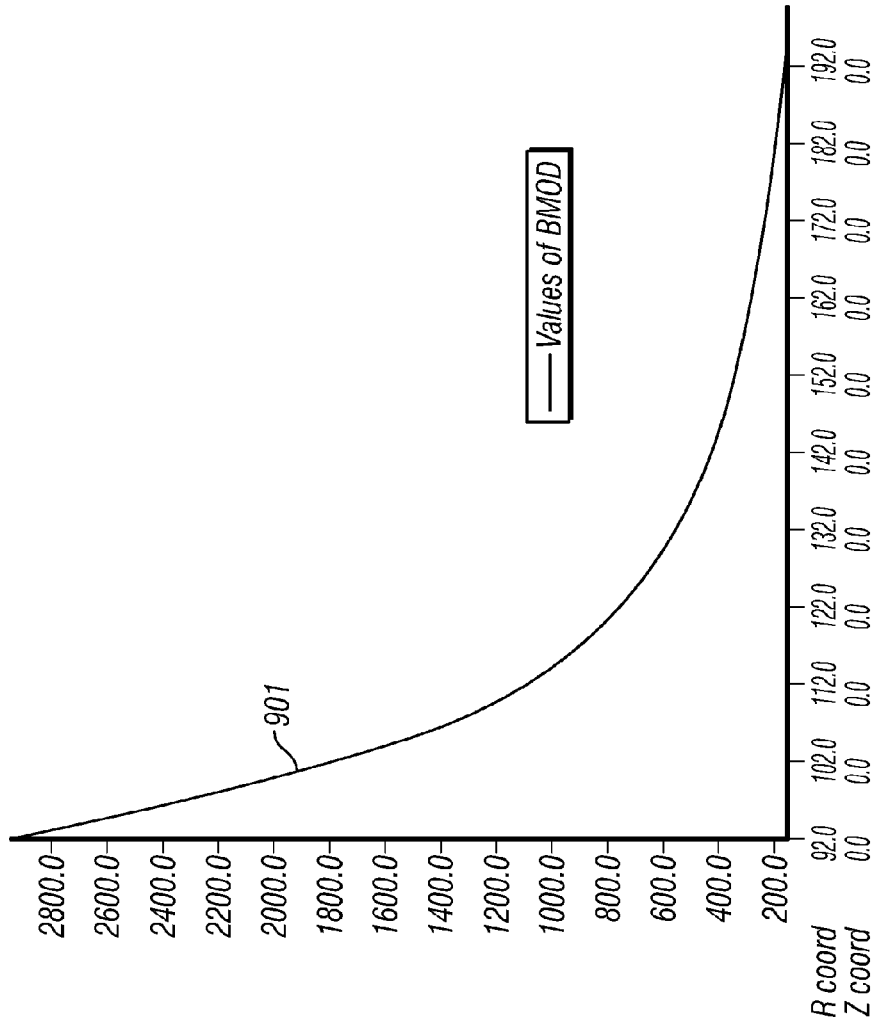
FIG. 9 is a plot of the flux density B over the radius R in the center plane of the demagnetizing sub showing that the demagnetizing sub erasure flux density is substantially equal to flux density for the NMR tool shown in FIG. 5.

FIG. 8 illustrates a contour plot of the magnetic flux density for the geometry of FIG. 6, showing the distribution outside the demagnetizer. FIG. 9 illustrates a magnetic flux density, B over radius, R in the center plane of the demagnetizer sub for the geometry of FIG. 6. The Z-axis represents the longitudinal axis and center of the borehole and of the demagnetizing sub 100. Further increasing the electrical power would not gain much more magnetic flux density as it is limited by the beginning of saturating the iron. An advantage of this geometry is the iron can easily formed from layers of transformer sheet (a laminated structure). The 2-D finite element models show a cross section orthogonal to the tool axis. The calculated field profiles are only correct for a tool that extends to infinity in the direction of the axis. For this reason the power dissipation results are stated in Watts/mm.

Figure 10:
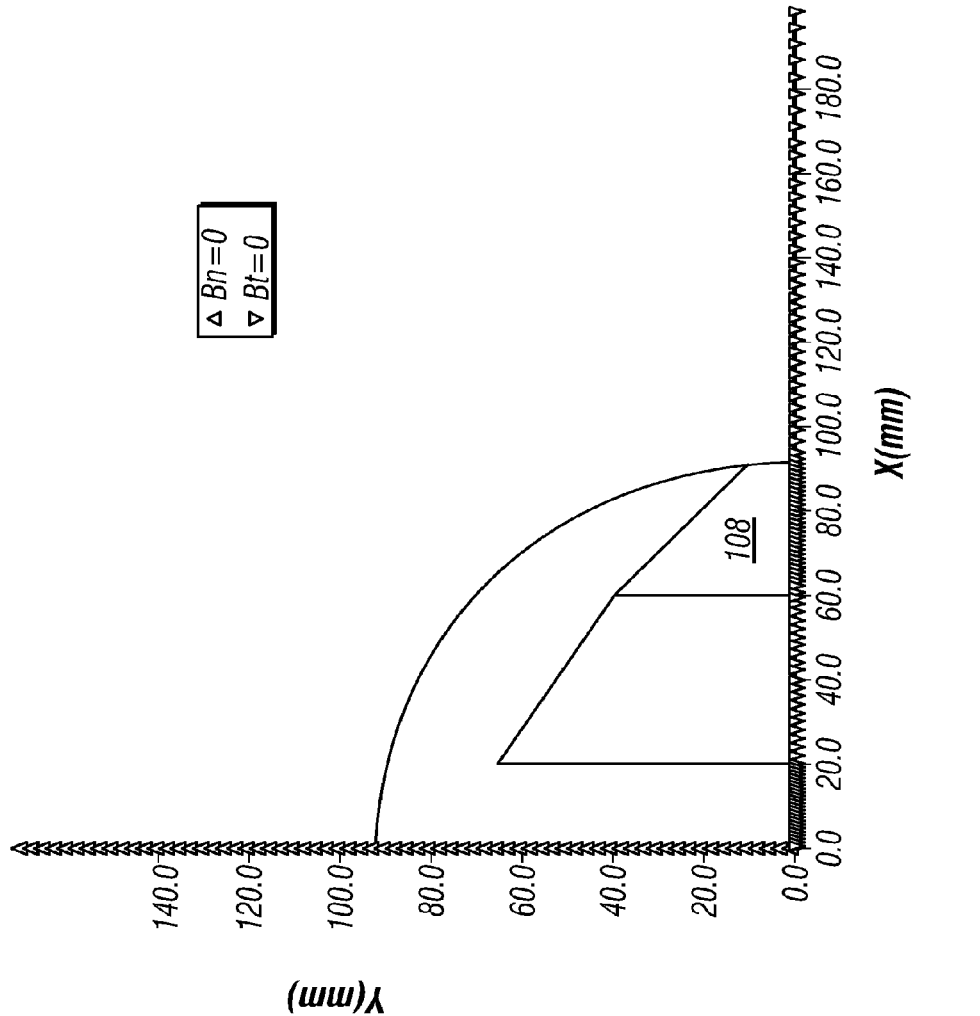
FIG. 10 shows the geometry of a vertical section of a two-pole demagnetizer.
Figure 10A:
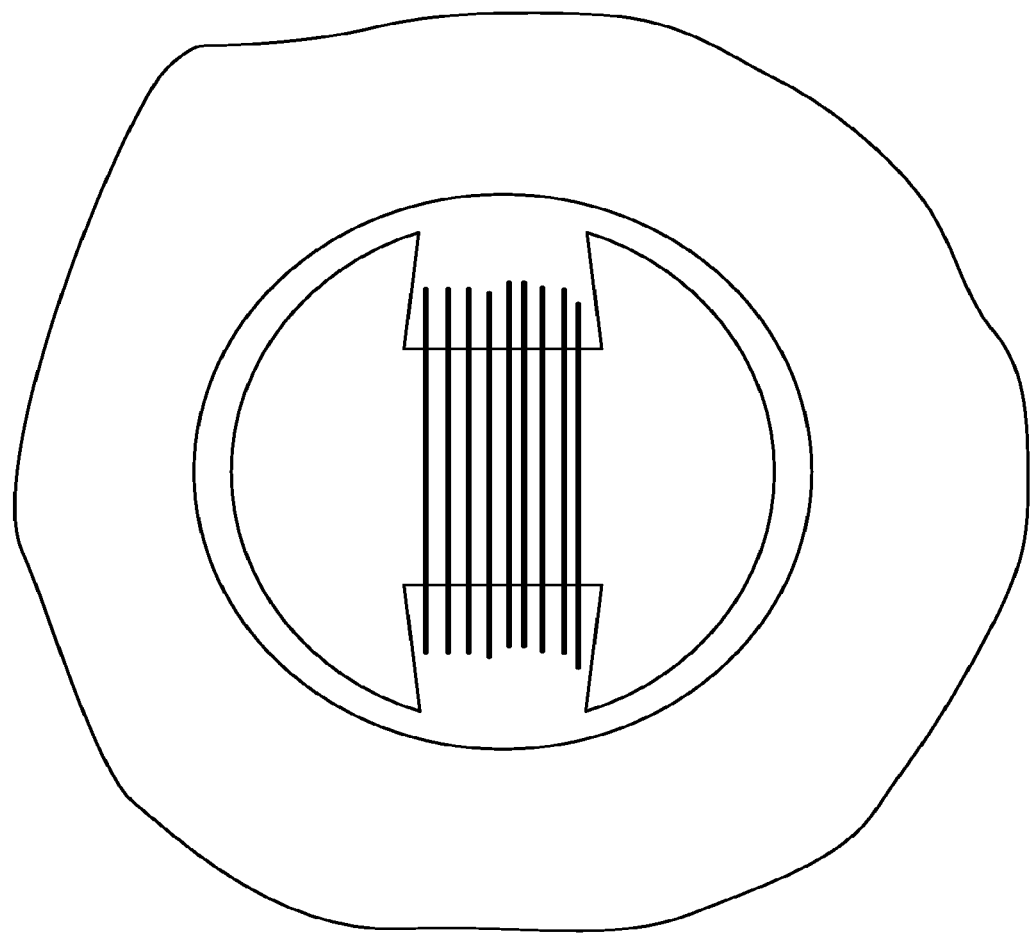
FIG. 10a shows the geometry of a horizontal section of a two-pole demagnetizer.
Figure 11:
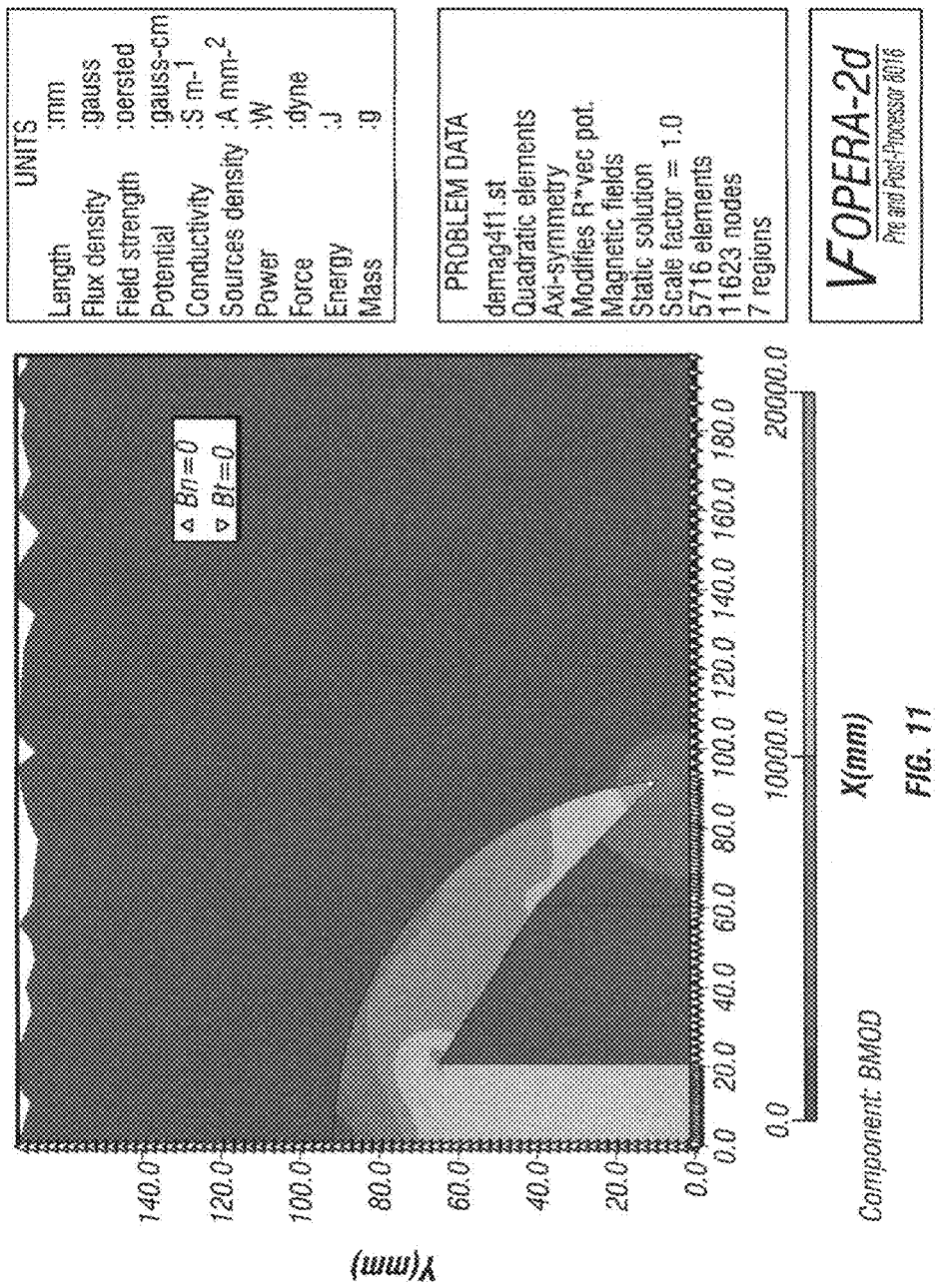
FIGS. 11 and 12 are contour plots of the magnetic flux density for the demagnetizer of FIG. 10.
Figure 12:
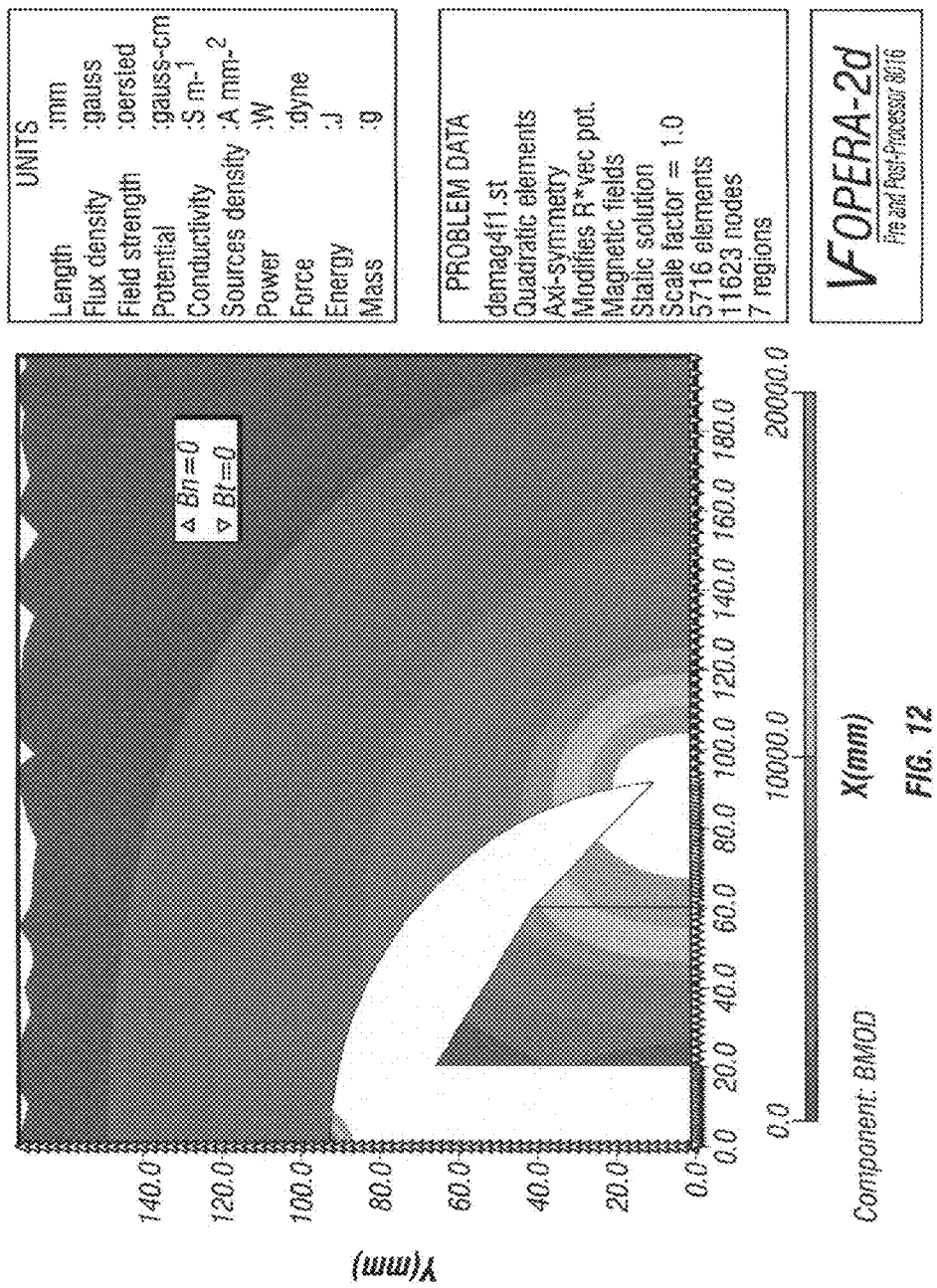
Figure 13:
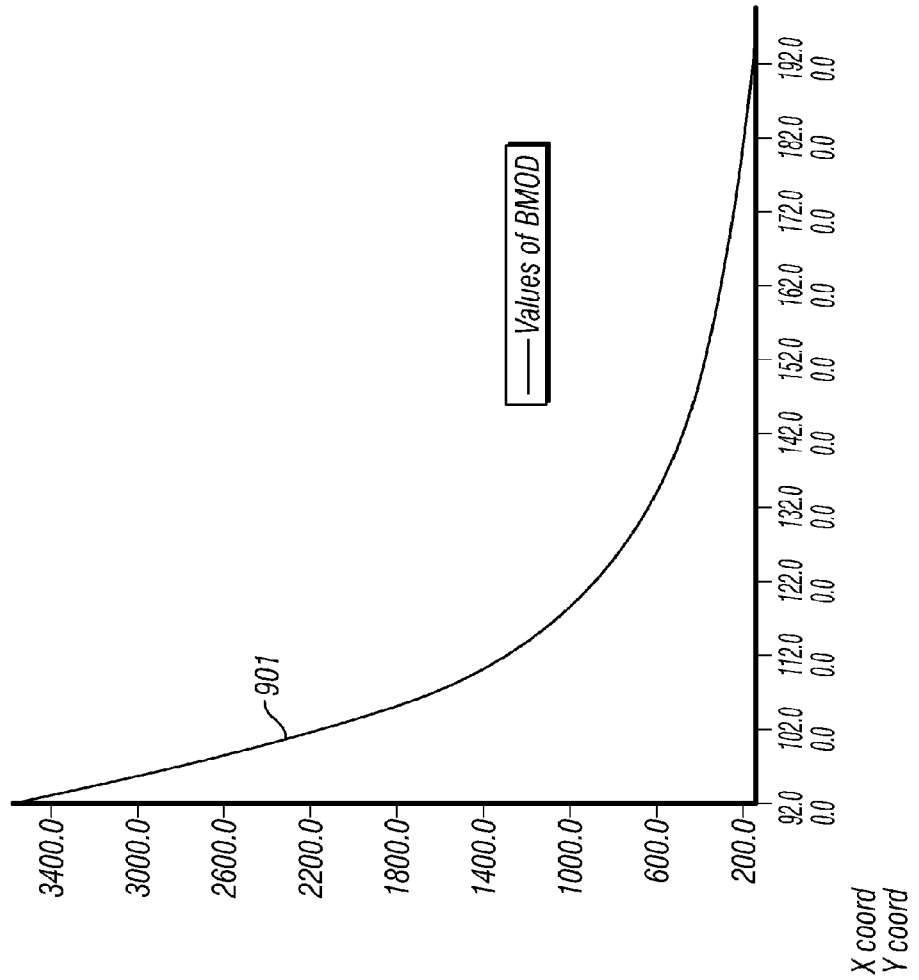
FIG. 13 shows the radial decay of magnetic flux density for the demagnetizer of FIG. 10.

FIGS. 10-13 show finite element modeling for one-quarter of a full cross section of a two-pole electromagnet generating a magnetic flux field perpendicular to the borehole axis. Shown in FIG. 10 is the geometry. A horizontal section of the two-pole demagnetizer is shown in FIG. 10a. FIG. 11 shows the magnetic flux density in the demagnetizer. FIG. 12 shows the magnetic flux density outside the demagnetizer. FIG. 13 shows the decay of the flux density 1301 with radius.

Figure 14:
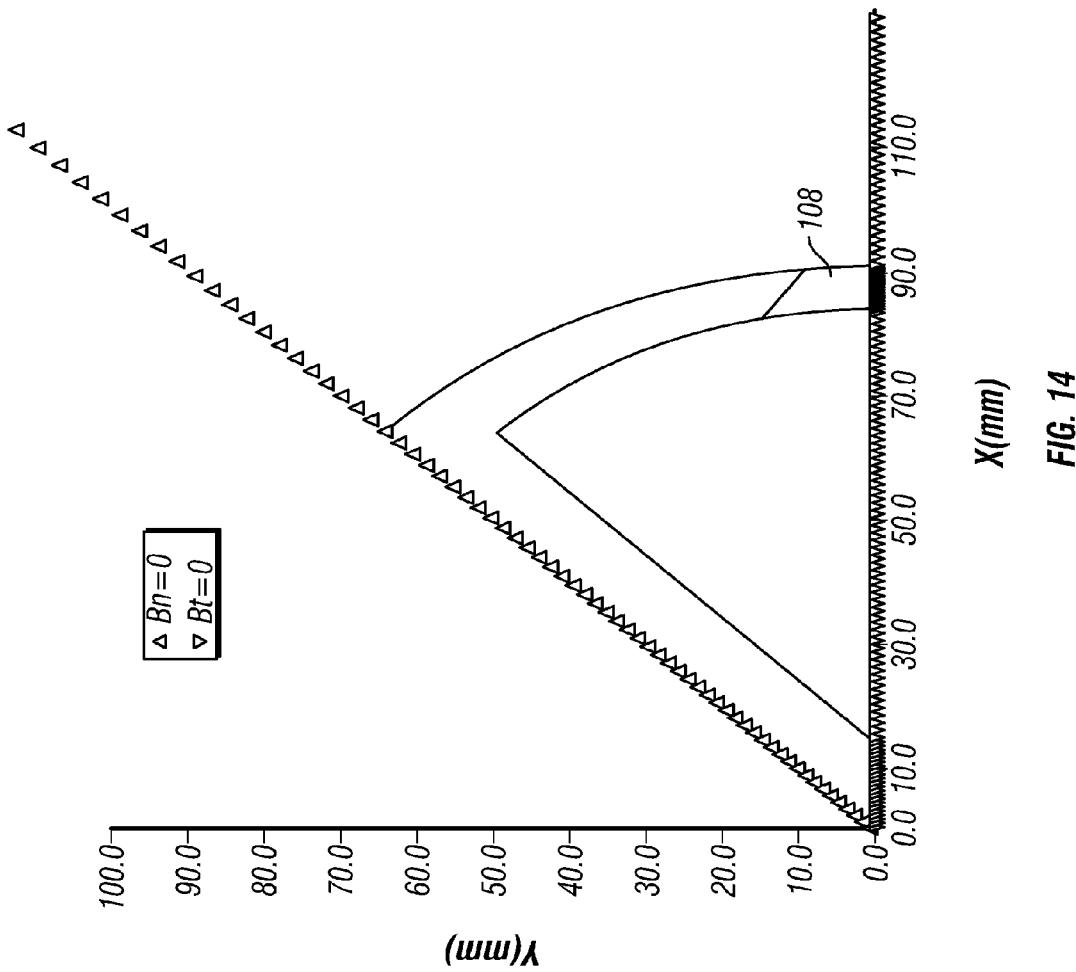
FIG. 14 shows the geometry of a vertical section of a four-pole demagnetizer.
Figure 14A:
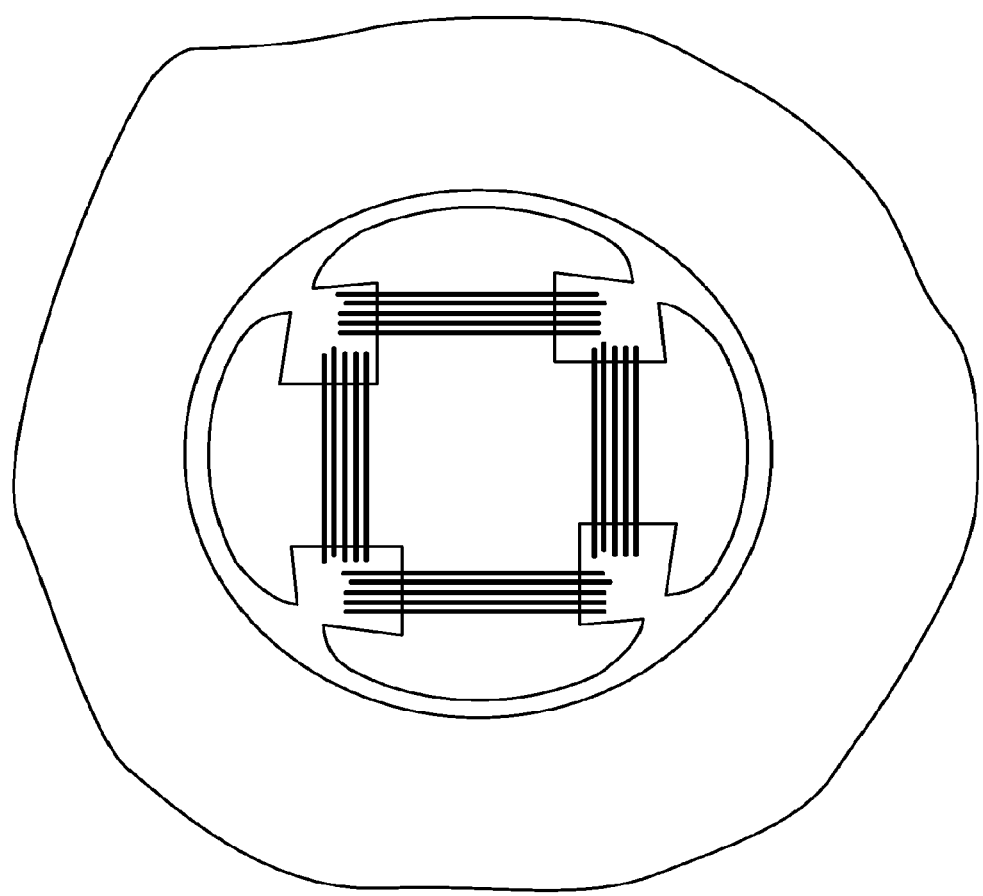
FIG. 14a shows the geometry of a horizontal section of a four-pole demagnetizer.
Figure 15:
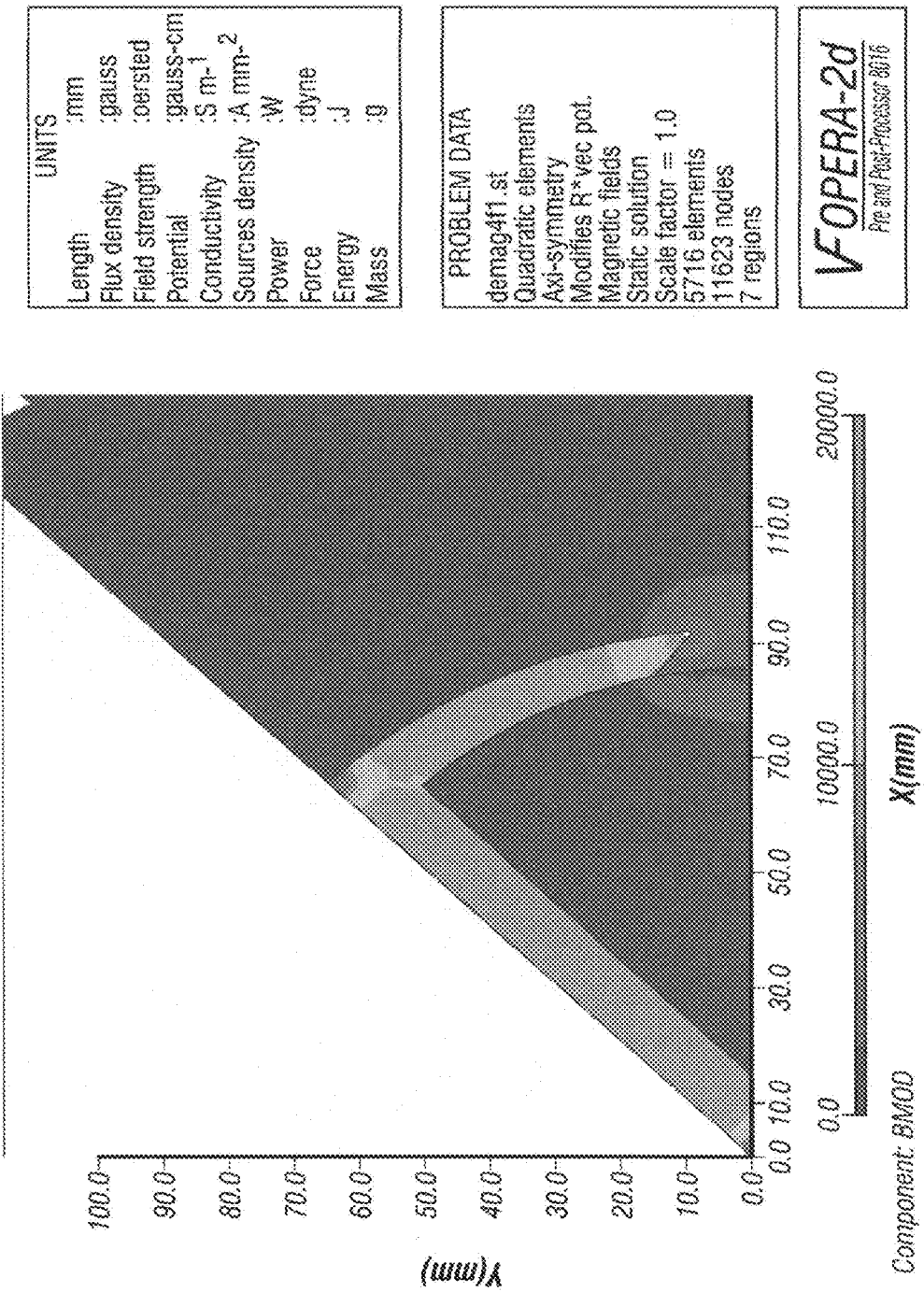
FIGS. 15-16 are contour plots of the magnetic flux density for the demagnetizer of FIG. 14.
Figure 16:
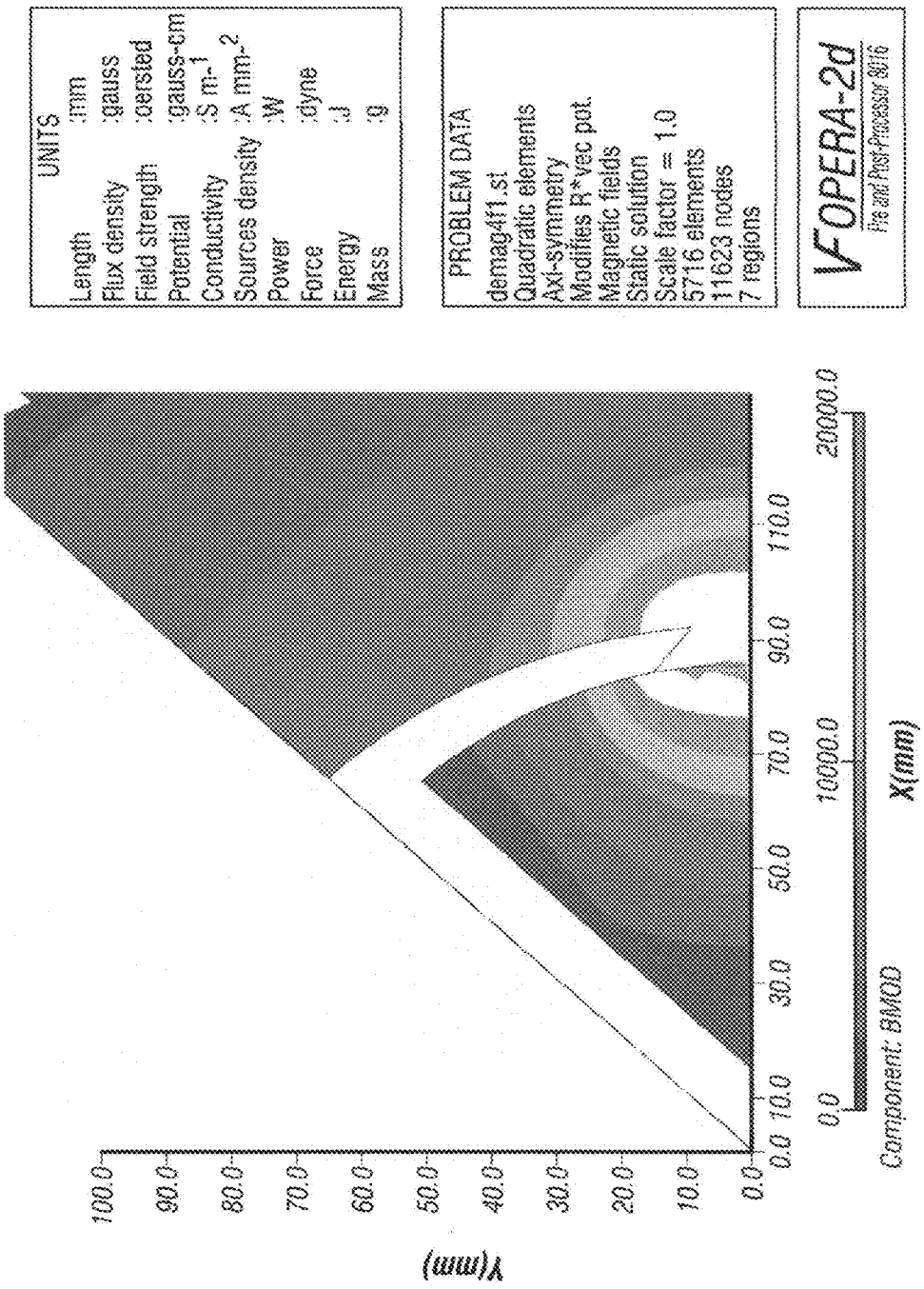
Figure 17:
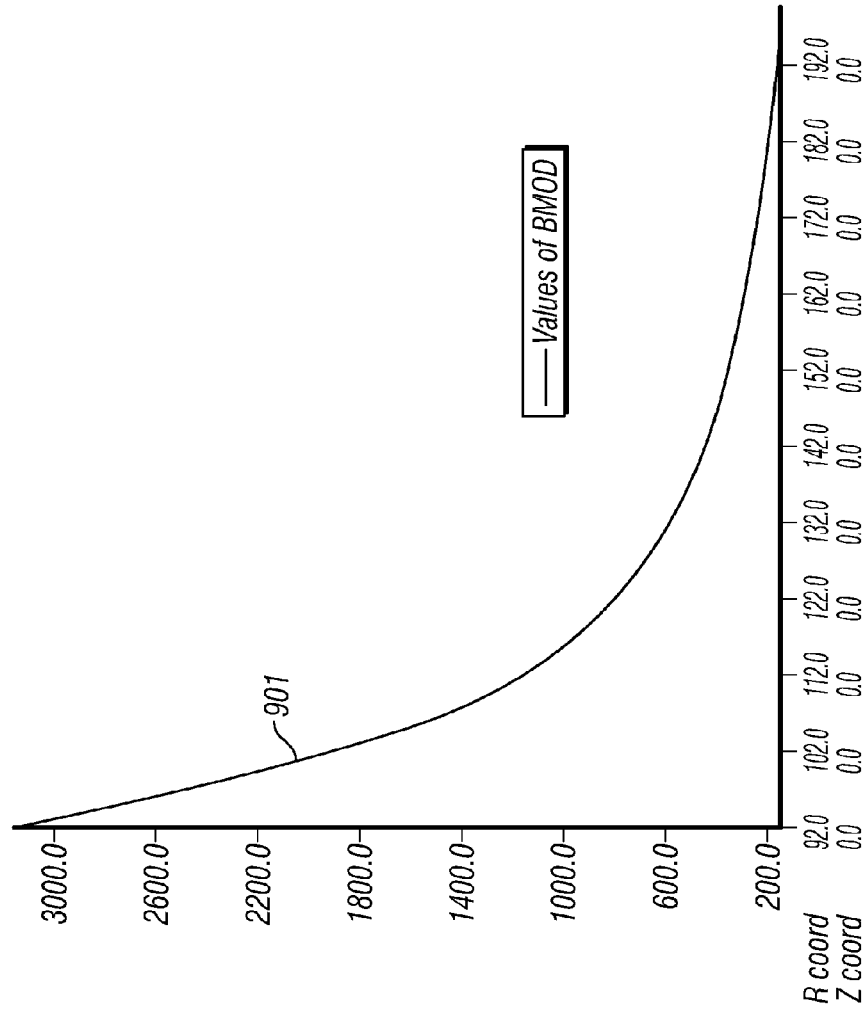
FIG. 17 shows the radial decay of magnetic flux density for the demagnetizer of FIG. 14.

FIGS. 14-17 show finite element modeling for one-eighth of a full cross section of a four-pole electromagnet generating a magnetic flux field perpendicular to the borehole axis. The Z-axis is parallel to the longitudinal axis of the borehole and the demagnetizing sub 100, which is perpendicular to the X, Y plane of FIGS. 10-17. FIGS. 14 and 14a show the geometry of the four-pole demagnetizer. The magnetic flux is concentrated about the gaps 108. FIGS. 15 and 16 are contour plots of the flux density. FIG. 17 is a plot of the radial decay of the flux density.

Figure 18:
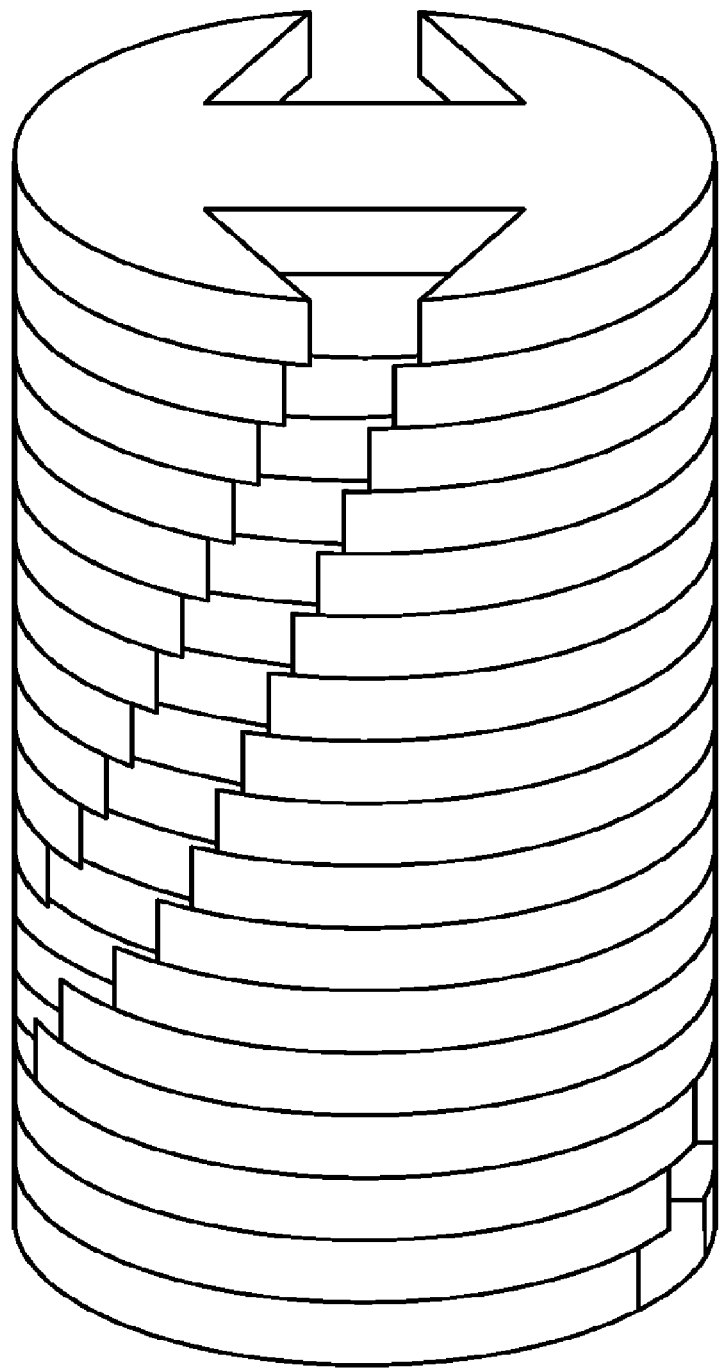
FIG. 18 shows the helical arrangement of the laminated core of a two-pole electromagnet.

In one embodiment the iron sheets are not be stacked directly on top of each other but slightly shifted by a small angle so that the finished iron core forms a helical structure. For a two-pole core a helix is provided with half a turn to ensure that the entire borehole wall gets demagnetized when we run the (non-rotating) demagnetizer tool through the borehole. This is illustrated in FIG. 18. For a four-pole tool a quarter helix is provided to achieve a complete demagnetizing. In another embodiment, the two-pole configuration, two demagnetizing fields separated by 180° are provided and the demagnetizing sub rotates at least 180° or one-half turn to expose the entire 360° angular section of the borehole at a particular depth to the demagnetizing field generated by the demagnetizing sub electromagnet. Similarly, for the four-pole configuration, four demagnetizing fields separated by 90° are provided and the demagnetizing sub rotates at least 90° or one-quarter turn to expose the entire 360° angular section of the borehole at a particular depth to the demagnetizing field generated by the demagnetizing sub electromagnet.

The pitch of the helix should not be too small to ensure a good demagnetizing effect further away from the tool. Eventually the length of the tool and its power dissipation depends on the minimum pitch that can be tolerated. An iron yoke is provided with a reasonably small gap 109 to produce a magnetic field of high enough strength with a limited electric power input. The transverse field geometry provides less problems with iron saturation. It is also better suited to the use of laminated transformer iron. The field decay quickly away from the demagnetizer tool.

It is desirable to ensure in the design that induced eddy current losses are minimized as they can consume a lot of power. If the power source is DC, it is useful to use at least two or more poles. By giving the different poles an appropriate phase shift to each other we can ensure that, at least theoretically, at every point in time we consume the same power.

EXAMPLE

Two poles: The phase shift should be 90°. Three poles: The phase shift should be 60° or 120° between poles. It may be that in the case of 120° makes better use of the iron, as in the case of a 3-phase main transformer.

Figure 19:
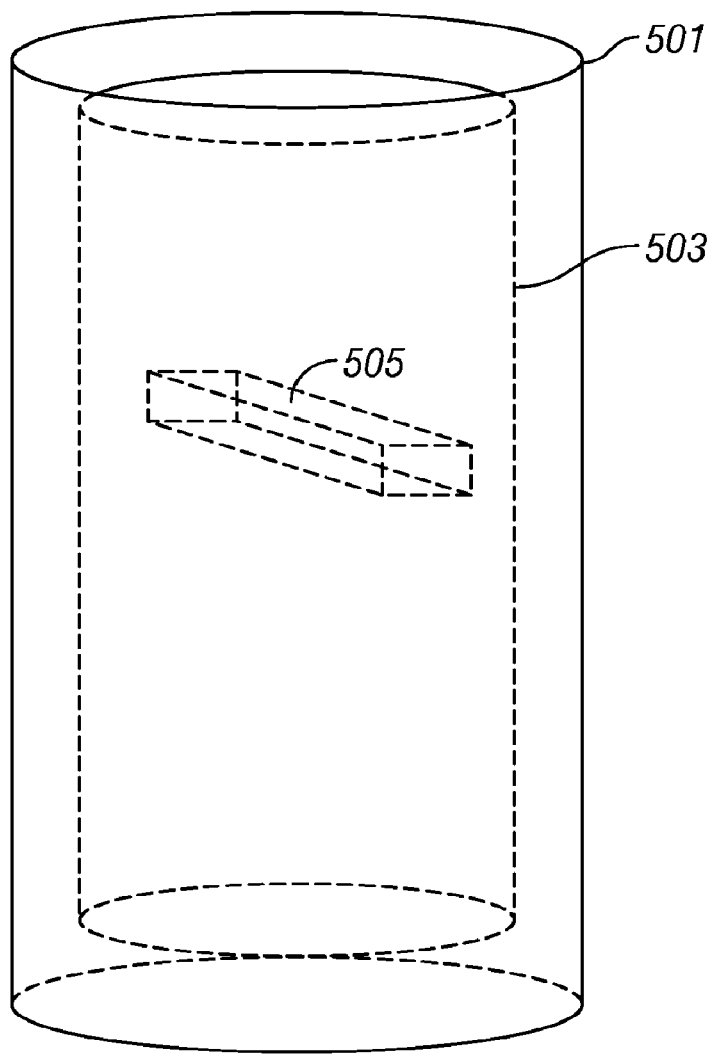
FIG. 19 shows an embodiment of the present invention using a permanent magnet.
Figure 20:
FIG. 20 shows the magnetic field at a selected depth when the invention of FIG. 19 is conveyed through the borehole.

Another embodiment of the present invention uses a spinning permanent magnet on the downhole assembly. The spinning magnet can be either a permanent magnet or a DC-powered electromagnet. This is depicted schematically in FIG. 19. Shown in a borehole having a wall 501 is a downhole assembly 503 that includes a permanent magnet 505. The permanent magnet spins within the borehole while the assembly is being moved through the borehole. FIG. 20 illustrates the magnetic 551 field that would be observed at an specific point on the borehole wall if the downhole assembly is moved through the borehole. When the downhole assembly is conveyed on a drilling tubular, the spinning may be accomplished by rotation of the drilling tubular. When the downhole assembly is conveyed on a wireline, then a suitable motor (not shown) would be provided on the downhole assembly to accomplish the rotation.

While an embodiment of the invention has been shown by the above invention, it is for purposes of example only and not intended to limit the scope of the invention, which is defined by the following claims.

What is claimed is:

1. An apparatus configured for use in a borehole in an earth formation, the apparatus comprising:
   a downhole assembly configured to be conveyed in the borehole;
   a control device included in the downhole assembly configured to produce an alternating magnetic field in the borehole having a diminishing amplitude at least one of a plurality of depths and reduce a magnetization of a wall of the borehole resulting from a previous magnetic tool run, wherein an initial amplitude of the alternating magnetic field is selected based on at least one of (i) a saturation field of the wall of the borehole, or (ii) a magnetic field intensity which produced magnetization of the wall of the borehole.

2. The apparatus of claim 1 wherein the control device comprises an electromagnet, the apparatus further comprising:
   (i) a source of alternating current coupled to the electromagnet configured to produce a time varying magnetic field in the magnetized material; and
   (ii) a processor configured to control the source of alternating current to reduce the amplitude of the time varying magnetic field.

3. The apparatus of claim 2 wherein the electromagnet further comprises (i) a coil, and (ii) a core.

4. The apparatus of claim 3 wherein the electromagnet further comprises a yoke made of a soft magnetic material.

5. The apparatus of claim 3 wherein the core comprises a laminated structure.

6. The apparatus of claim 2 wherein an axis of the electromagnet is at least one of (i) substantially parallel to a longitudinal axis of the downhole assembly, and (ii) substantially orthogonal to a longitudinal axis of the downhole assembly.

7. The apparatus of claim 2 wherein the electromagnet comprises one of (i) a two-pole structure, and (ii) a four-pole structure.

8. The apparatus of claim 2 wherein the electromagnet further comprises a laminated core having a helical structure.

9. The apparatus of claim 2 wherein the processor is at a downhole location.

10. The apparatus of claim 1 wherein the control device comprises a spinning magnet and wherein the amplitude is diminished by motion of the downhole assembly through the borehole.

11. The apparatus of claim 10 wherein the spinning magnet is selected from the group, consisting of a) a permanent magnet or b) a DC-powered electromagnet.

12. The apparatus of claim 1 wherein the downhole assembly is selected from (i) a bottomhole assembly conveyed on a drilling tubular, or (ii) a component of a string of wireline conveyed instruments.

13. The apparatus of claim 1 wherein the downhole assembly is configured to be conveyed in a cased borehole.

* * * * *